United States Patent [19]

Müller

[11] 4,018,859
[45] Apr. 19, 1977

[54] ARRANGEMENT FOR AERATING OF LIQUIDS

[76] Inventor: Hans Müller, Alte Landstr. 415, 8707 Mannendorf, Switzerland

[22] Filed: Sept. 15, 1975

[21] Appl. No.: 613,305

Related U.S. Application Data

[63] Continuation of Ser. No. 419,726, Nov. 28, 1973, abandoned.

[30] Foreign Application Priority Data

Dec. 1, 1972 Germany ............................ 017630
June 8, 1973 Switzerland .................. 008428/73

[52] U.S. Cl. .................................. 261/87; 195/142; 195/143; 259/23; 261/151; 261/DIG. 75
[51] Int. Cl.² .......................................... B01F 3/04
[58] Field of Search ............... 261/29, 87, 93, 112, 261/152, 151, DIG. 42, DIG. 75; 259/23; 195/109, 142–144

[56] References Cited

UNITED STATES PATENTS

| | | | |
|---|---|---|---|
| 2,061,564 | 11/1936 | Drake et al. .......................... | 261/93 |
| 2,928,665 | 3/1960 | Epprecht ............................. | 261/87 |
| 2,964,382 | 12/1960 | Hall, Jr. ............................... | 261/93 X |
| 3,355,106 | 11/1967 | Graham .............................. | 261/93 X |
| 3,393,802 | 7/1968 | Logue et al. ........................ | 261/93 X |
| 3,584,840 | 6/1971 | Fuchs ................................. | 261/87 X |
| 3,625,834 | 12/1971 | Muller ................................ | 261/93 X |
| 3,722,679 | 3/1973 | Logue ................................ | 261/DIG. 75 |
| 3,735,568 | 5/1973 | Beck ................................... | 261/151 X |
| 3,739,556 | 6/1973 | Waters ............................... | 261/112 X |
| 3,823,923 | 7/1974 | Chapsal ............................. | 261/DIG. 42 |

FOREIGN PATENTS OR APPLICATIONS

| | | | |
|---|---|---|---|
| 48,730 | 4/1934 | Denmark ............................ | 261/93 |
| 1,474,582 | 2/1967 | France ............................... | 261/87 |
| 562,894 | 7/1944 | United Kingdom ................. | 261/93 |

*Primary Examiner*—Tim R. Miles
*Assistant Examiner*—Richard L. Chiesa

[57] ABSTRACT

A vessel is provided for a liquid, and a centrifugal aerating arrangement is provided in the vessel. The aerating arrangement includes a hollow substantially disc-shaped rotor mounted for rotation in the vessel and having a hub, a periphery which is formed with a plurality of outlet openings communicating with the interior of the rotor, and a Venturi-shaped inlet opening formed in an axial end of the rotor and communicating with the interior. A passage extends in part through the hub and communicates the interior with a source of gas. A drive is provided for rotating the rotor so that centrifugally created suction aspirates liquid through the inlet opening and gas through the passage, both of them entering the interior wherein they become mixed to be subsequently ejected centrifugally through the outlet openings.

13 Claims, 5 Drawing Figures

ARRANGEMENT FOR AERATING OF LIQUIDS

This is a continuation of application Ser. No. 419,726, filed on Nov. 28, 1973, now abandoned.

BACKGROUND OF THE INVENTION

The present invention relates to an arrangement for aerating of liquids, which is particularly although not exclusively suitable for use in aerobic microbiological processes, such as for instance the case in the production of antibiotics, the growing of microorganisms and in chemical gas reactions.

I wish it to be understood that the term "aerating" as used in the following description and in the appended claims is intended not merely to refer to the mixing of liquid with air, but in fact to the mixing of liquid with any type of gas.

It is well known that the more intensive the aeration of liquid in the case of an aerobic fermentation process, the better the growth of the microorganisms which can be obtained. It is also known that the smaller the gas bubbles which are added into the liquid, the better will be the gas-liquid exchange that can take place. Heretofore, however, the prior art in its proposals for the aerating of liquids has always assumed that a relatively uniform liquid medium is to be subjected to aeration. However, this is by no means always the case.

Thus, the aerating of a medium which, for instance, may contain yeast poses requirements which are entirely different from those of other media, for instance a liquid medium containing penicillin (Mycel). Moreover, neither of these exemplary circumstances involves a Newtonian liquid.

One type of aerating apparatus that has been proposed in the prior art uses rotors which are provided at their periphery with gas outlet openings which communicate with an inlet opening and wherein a flow of the gas is established and maintained due to suction resulting from the centrifugal ejection of the gas through the outlet openings. This type of equipment is for instance described in H. G. Rehm, Industrial Microbiology, page 66, Berlin, Heidelberg, New York, 1967. The difficulty encountered with this type of equipment has been that in order to obtain the necessary suction effect, the rotors must turn at rather high speed, which means that if the liquid in which they turn and which is to be aerated is relatively viscous, the equipment will work either very poorly or not at all. The pressure head of the gas is small and not controllable.

SUMMARY OF THE INVENTION

Accordingly, it is a general object of the present invention to provide an improved arrangement for aerating of liquids which is not possessed of the disadvantages heretofore encountered.

More particularly, it is an object of the present invention to provide such an improved arrangement for aerating of liquids which will operate reliably under all circumstances and with all types of liquids, including relatively highly viscous liquids.

In keeping with the above objects, and with others which will become apparent hereafter, one feature of the invention resides, in an arrangement for aerating of liquids, in a combination which comprises a vessel for a liquid, and centrifugal aerating means for aerating the liquid. The aerating means includes a hollow substantially disc-shaped rotor mounted for rotation in the vessel and having a hub, a periphery which is formed with a plurality of outlet openings communicating with the interior of the rotor, and a Venturi-shaped inlet opening formed in an axial end of said rotor and communicating with the interior of the latter. Passage means extends in part through the hub and communicates the interior with a source of gas. Drive means is provided for rotating the rotor in the vessel so that centrifugally created suction aspirates liquid through the inlet opening and gas through the passage means into the interior, wherein they become admixed prior to centrifugal ejection of the thus aerated liquid through the outlet openings.

Depending upon the cross section of the venturi-shaped inlet opening, and the rotational speed of the rotor, the pressure head can be varied and so can the amount of gas that is being aspirated.

I have found that in gas reactions of the type for which the present invention is intended, for instance in fermentation processes, liquid-gas dispersions develop in the vessel which are dependent upon the specific gravity of the dispersion. The greater the ratio of the absolute quantity of gas to the quantity of liquid in the dispersion, the more the quantity and pressure head of the gas will change. In order to obtain an optimum quantity and pressure head for the gas, that is to obtain optimum results at lowest possible power input required for turning the rotor, the cross section of the Venturi-shaped inlet opening can be made variable in accordance with a concept of the invention. Furthermore, a concept of the invention proposes to vary the quantity of liquid which is aspirated per unit time, and to thereby vary the quantity of gas that is aspirated by the rotor and becomes admixed with the liquid. This permits a ready accommodation of the novel arrangement to particular requirements. It is evident that the greater the quantity of liquid that is aspirated per unit time, and the smaller the cross section of the inlet opening, the greater will be the pressure head.

It is desired to be able to vary these factors to accommodate the arrangement to particular circumstances of a given case, and in particular in order to be able to maintain the power input required for turning the rotor as small as possible, such power input being at least partly directly dependent upon the reaction that takes place in the vessel. It is very difficult to predetermine these parameters for specific processes, and therefore the adjustments which are contemplated in accordance with the present invention make it possible to accommodate the arrangement to the circumstances as they are encountered in a given situation, rather than to construct the arrangement non-adjustable and for a specific application.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawing.

DESCRIPTION OF THE PREFERRED EMBODIMENTS

Figure 1:
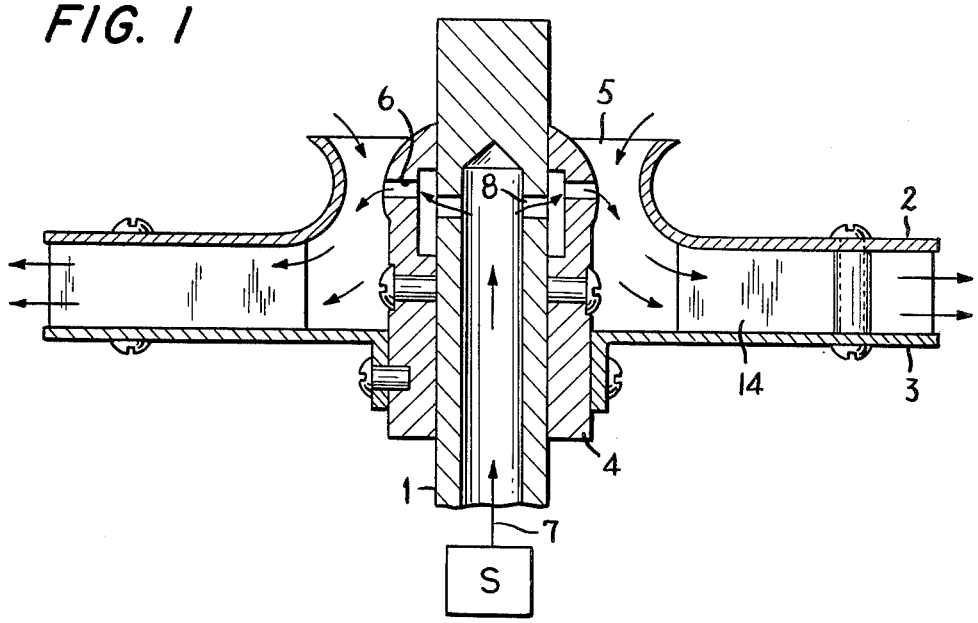
FIG. 1 is a fragmentary axial section illustrating a rotor of an arrangement according to the present invention in one embodiment thereof.

Referring firstly to FIG. 1, it will be seen that this illustrates the simplest construction of a rotor according to an embodiment of the invention. Reference numeral 1 identifies a hollow shaft on which there is mounted a rotor. The rotor has a hub 4 to which there is secured a disc-shaped end wall 3 having guide blades 14 which extend from the region of its center to its outer periphery, and a further substantially disc-shaped end wall or plate 2 which is connected with the end wall 3 by means of the illustrated screws or bolts, so as to define a hollow interior of the generally disc-shaped rotor. On the periphery of the rotor the latter is provided with a plurality of outlet openings which are defined between circumferentially adjacent ones of the blades 14. The end wall 2 is formed with a substantially Venturi-shaped inlet opening 5 communicating with the hollow interior at the center of the rotor so that, when the latter is rotated by rotating the shaft 1, liquid from a body of liquid in a vessel in which the rotor of FIG. 1 is mounted, will be drawn in through the inlet opening 5 to flow in the direction indicated by the arrows between the blades 14 and out of the openings at the periphery of the rotor. The liquid will have its greatest flow speed in the neck region of the Venturi-shaped inlet opening 5, that is in the region where it circulates past gas inlet openings 6 provided in the hub 4 and communicating with the hollow interior of the shaft 1, which interior in turn communicates with the diagrammatically illustrated source S of gas, so that gas flows in the direction of the arrow 7. The interior of the shaft 1 is in communication with the inlet openings 6 by intermediate openings 8. The gas is aspirated in the direction of the arrow 7 by the high-speed flow of the liquid through the Venturi-shaped inlet opening 5 past the gas inlet openings or passages 6, which creates a suction in the interior of the shaft 1.

Figure 2:
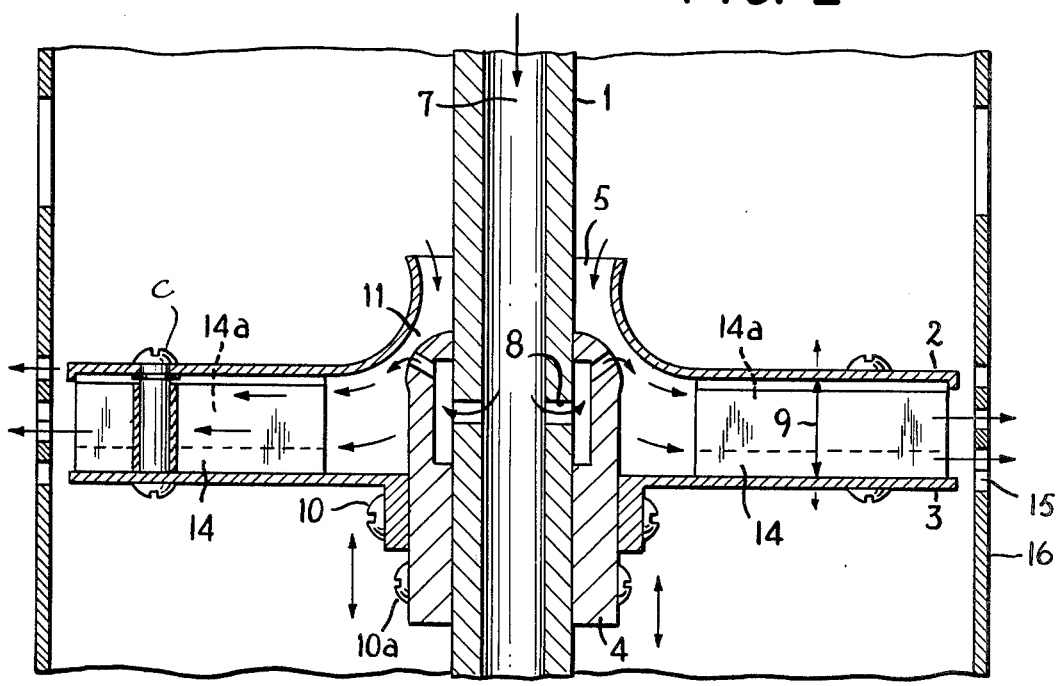
FIG. 2 is a view similar to FIG. 1, but illustrating a further embodiment of the invention.

As pointed out before, it is desirable that the quantity of liquid flowing through the rotor per unit time, the suction head and the quantity of gas which is aspirated be adjustable so that the arrangement of the invention can be readily accommodated to different requirements. FIG. 2 shows an arrangement wherein these possibilities are realized.

Essentially, the embodiment of FIG. 2 is reminiscent of that of FIG. 1, and like elements are identified with like reference numerals.

Figure 5:
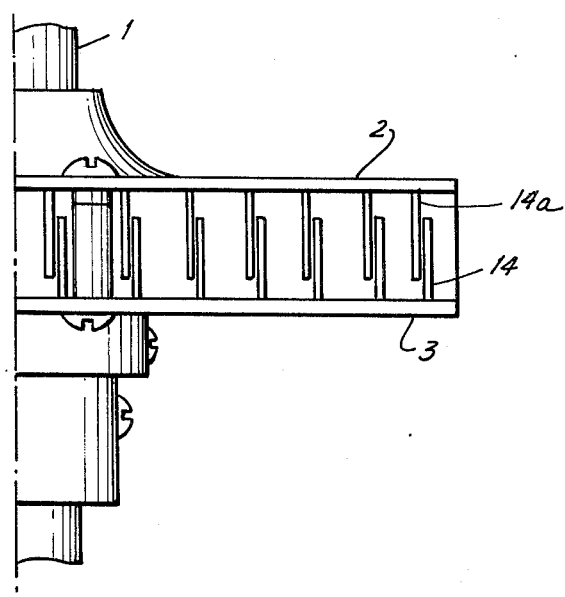
FIG. 5 is a side view of the embodiment illustrated in FIG. 2.

In this embodiment, however, the distance 9 between the end walls 2 and 3 is adjustable, to permit the quantity of liquid flowing through the rotor per unit time to be increased or decreased, as desired. This can be accomplished in various ways, and by way of example I have illustrated that in this embodiment the end wall 2 may also be provided with blades 14a each of which is laterally adjacent to and in overlapping abutment with one of the blades 14. Thus, if the end walls 2 and 3 are moved apart or together, the blades 14a which are indicated in broken lines because they are not directly visible in FIG. 2, will slide on the blades 14. The overlapping condition of blades 14 and 14a is best seen in FIG. 5. Relative axial movement of end walls 2 and 3 will, of course, also result in a variation of the effective flow-through cross-section 11 of the inlet opening 5. The connecting arrangements C which permit the end walls 2 and 3 to be moved apart or together, and to hold them at the selected spacing 9, are illustrated in FIG. 2, one of them (there may of course be several circumferentially spaced ones) being shown in section for clarity.

In addition, the effective flow through cross section 11 of the Venturi-shaped inlet opening 5 can be separately varied by shifting the hub 4 on the shaft 1 with reference to the elements 2 and 3. For this purpose, the screws 10 can be loosened, together with the screws 102 and the hub 4 can then be shifted until the desired cross section of the passage 11 is obtained. The purpose of this arrangement is to vary the suction head and the amount of gas flow through the openings 6.

The embodiment of FIG. 2 provides for the two above-described adjustments which can be carried out independently of one another. In some circumstances, that is in the case of certain reactions, a significant suction head is required with concomitant large liquid flow per unit time. In this case, the Venturi-shaped flow through cross section 11 should be as small as possible, to obtain a strong flow and high suction at the openings 6. Some liquids to be pumped have a great tendency to form foam, in which case the specific gravity of the gas-liquid dispersion will drop, so that the flow per unit time must be increased for the same suction head. For this purpose the other adjustment may be utilized, in order to provide compensation.

In FIGS. 1 and 2, as well as in the following Figures, the dispersion of the gas in the body of liquid surrounding the rotor can be further improved, if desired, by providing in the region of the outlet openings at the periphery of the rotor suitable baffles or the like. For instance, such a baffle can be provided as indicated at 16 in FIG. 2, where the baffle is tubular and provided with openings 15 through which the gas-liquid mixture is forced. The baffle surrounds the rotor with slight spacing so as not to interfere with the rotation of the same.

The source of gas is identified diagrammatically with reference character S.

The embodiments thus described with reference to FIGS. 1 and 2 can be used singly or in any desired number in conjunction with the hollow shaft 1, and the latter may be either vertical, horizontal or otherwise oriented. For instance, if the vessel is a horizontally oriented vessel, then the shaft 1 may also be horizontally oriented, such arrangement having the advantage that relatively low suction heads are required for properly aerating large quantities of liquid with a relatively low energy input requirement.

Figure 3:
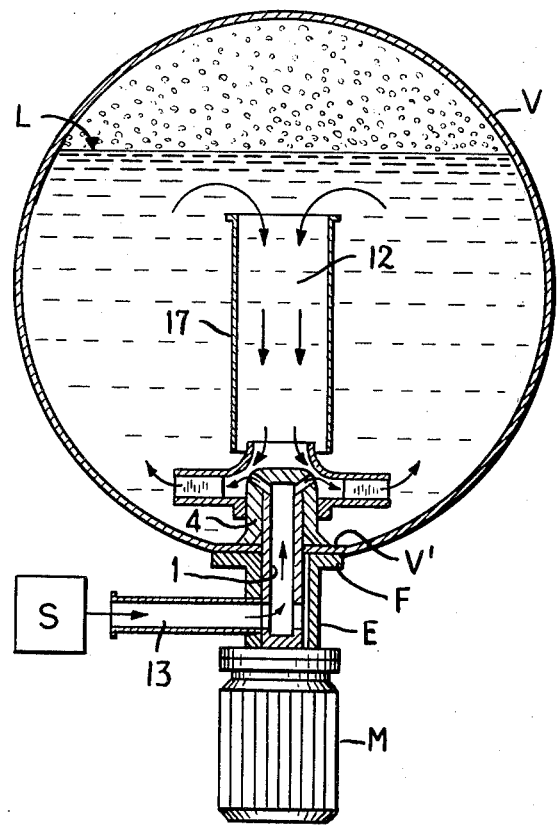
FIG. 3 is an axial section through an arrangement according to still another embodiment of the invention.

FIG. 3 shows an embodiment wherein the vessel V is of spherical configuration and wherein the somewhat diagrammatically illustrated rotor is mounted to a flange V' of the vessel which latter is, incidentally, of metallic material in this embodiment. Here, an inlet conduit 13 is provided which again communicates with a source S of gas. The shaft 1 is driven in rotation by the diagrammatically illustrated motor M. A support element E journals the shaft 1 for rotation and is provided with a flange F by means of which the arrangement can be secured to the vessel flange V', for instance by bolting it thereto.

A tubular extension member is provided, identified with reference numeral 17 and extending from the inlet opening 5 upwardly to provide a path for the liquid which is being drawn into the rotor. This is, for instance, of advantage if the dispersion has the tendency to separate due to floatation, that is if floating components rise to the surface of the liquid. In this case, the extension 17 thus makes it possible to draw liquid from or from near the level L of the body of liquid to assure that those components which tend to float up are also being drawn into the rotor. In other words, the level at which it is now possible to draw liquid is identified with reference numeral 12, and it will be appreciated that the extension 17 could be made longer or shorter, or might even be telescopic to permit desired adjustments. The extension 17 can be mounted on the rotor and rotate with the same, or could be mounted so as to be stationary, for instance by being connected with a wall of the vessel V.

I have found that the invention is particularly well suited for use with spherical vessels, although this is not to be construed as meaning that it can only be used with such vessels, which is evidently not the case. However, if the vessel is spherical and is filled with liquid approximately half way, the volumetric liquid content of the vessel will be greater than that which could be accommodated in a cylindrical vessel having an axial length corresponding to the diameter of the spherical vessel. This is of considerable importance with respect to overcoming of the hydrostatic pressure by the suction effect created in the centrifugal aerating arrangement. Moreover, in many instances where the contents of the vessel tend to develop foam, the particular configuration of a spherical vessel tends to facilitate the breaking-up of the foam which is usually desired. Also, the greater structural strength of a spherical configuration permits the use of thinner materials for its wall, and savings in material up to one-third by comparison to conventional vessels of the same volumetric capacity are possible.

Figure 4:
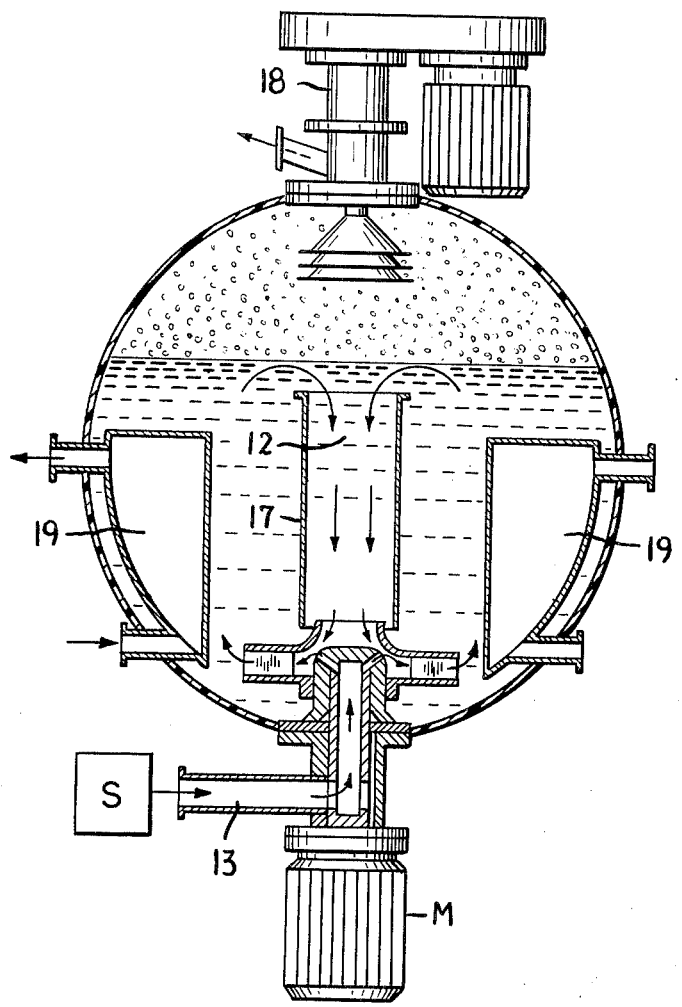
FIG. 4 is a view similar to FIG. 3, but illustrating still a further embodiment of the invention.

FIG. 4 shows an embodiment which in all other respects is similar to the one in FIG. 3, except that the vessel which is spherical is here made of synthetic plastic material, and a mechanical foam breaker 18 of already well known construction is provided to break up foam which tends to form in the upper part of the vessel above the level of the liquid.

Reference numeral 19 in this case identifies inserts through which a heat exchange liquid can be circulated, for instance hot or cool fluid for heating or cooling the contents of the vessel, that is influencing the temperature of the contents. This is particularly simple in a spherical vessel because of the larger available volumetric content thereof, and the use of such heat exchange elements is especially advantageous in the case of exothermic processes, for instance during the aerobic growth of microorganisms.

It will be understood that each of the elements described above, or two or more together, may also find a useful application in other types of constructions differing from the type described above.

While the invention has been illustrated and described as embodied in an arrangement for aerating of liquids, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an arrangement for aerating fluids, a combination comprising a vessel for a fluid; centrifugal aerating means, including a hollow substantially disc-shaped rotor having two axially-spaced end walls mounted for rotation in said vessel and having a hub, a periphery of said rotor being formed with a plurality of outlet openings communicating with the interior of said rotor, said rotor and hub bounding a Venturi-shaped passage of hourglass configuration having an inlet opening formed in an axial end of said rotor which communicates with said interior having an upstream converging portion, a downstream diverging portion, and a throat portion intermediate said upstream and downstream portions and having a transverse section of cross-sectional area smaller than any cross-sectional area of said upstream and downstream portions; a first and a second set of elongated blades, each set being mounted on a respective end wall and extending generally in direction radially outwardly of said rotor; means for mounting said first set in surface contact with said second set so that respective ones of said blades of said first set are in sliding abutting engagement with and at least partially overlap respective ones of said blades of said second set in axial direction of said rotor; passage means extending in part through said hub and communicating said interior with a source of gas; said passage means having one open end in communication with a source of gas, and another open end at said transverse section of said throat portion for admitting the gas directly into the fluid flowing through said passage so as to obtain a thorough intermixing of the fluid and the gas; and means for generating a suction Venturi-type effect by rotating said rotor in said vessel so that centrifugally created suction will aspirate fluid through said inlet opening and gas through said passage means into said interior, wherein the gas and fluid become mixed prior to centrifugal ejection of the thus-aerated fluid through said outlet openings.

2. A combination as defined in claim 1; further comprising a hollow shaft on which said rotor is mounted for rotation therewith, said passage means being in part provided in said hollow shaft.

3. A combination as defined in claim 1; and further comprising means for varying the effective flow-through cross section of said inlet opening.

4. A combination as defined in claim 1; and further comprising an apertured tubular baffle surrounding said rotor with radial spacing therefrom.

5. A combination as defined in claim 1; and further comprising a guide tube extending from said inlet in direction towards the surface of a body of fluid which is accommodated in said vessel.

6. A combination as defined in claim 1; and further comprising a mounting flange for mounting said aerating means in said vessel.

7. A combination as defined in claim 1, wherein said vessel is provided with apertures for entry and exit of air.

8. A combination as defined in claim 1, wherein said vessel is of metallic material.

9. A combination as defined in claim 1, wherein said vessel is of synthetic plastic material.

10. A combination as defined in claim 1; and further comprising cooling means for cooling the contents of said vessel.

11. A combination as defined in claim 1; and further comprising heat-exchange means for controlling the temperature of the contents of said vessel.

12. A combination as defined in claim 1; and further comprising adjusting means for varying the degree of overlap of said sets of blades from one another so as to vary the volumetric content of said interior and thereby the quantity of fluid flowing through said interior per unit time.

13. A combination as defined in claim 1, wherein said vessel is of spherical configuration.

* * * * *